US012368305B2

(12) United States Patent
Schreck et al.

(10) Patent No.: US 12,368,305 B2
(45) Date of Patent: Jul. 22, 2025

(54) CONTROLLING EXCHANGES OF ENERGY BETWEEN A PLURALITY OF SYSTEMS CONNECTED TO AN ELECTRICAL GRID

(71) Applicant: Siemens Aktiengesellschaft, Munich (DE)

(72) Inventors: Sebastian Schreck, Nuremberg (DE); Ileskhan Kalysh, Aachen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 32 days.

(21) Appl. No.: 18/576,850

(22) PCT Filed: Jun. 15, 2022

(86) PCT No.: PCT/EP2022/066269
§ 371 (c)(1),
(2) Date: Jan. 5, 2024

(87) PCT Pub. No.: WO2023/280535
PCT Pub. Date: Jan. 12, 2023

(65) Prior Publication Data
US 2024/0313548 A1    Sep. 19, 2024

(30) Foreign Application Priority Data
Jul. 7, 2021  (EP) .................................. 21184318

(51) Int. Cl.
*H02J 3/48* (2006.01)
*H02J 3/26* (2006.01)
*H02J 3/38* (2006.01)

(52) U.S. Cl.
CPC .................. *H02J 3/48* (2013.01); *H02J 3/26* (2013.01); *H02J 3/381* (2013.01); *H02J 2203/10* (2020.01); *H02J 2300/24* (2020.01)

(58) Field of Classification Search
CPC ...... H02J 3/26; H02J 3/381; H02J 3/48; H02J 2300/24
(Continued)

(56) References Cited

U.S. PATENT DOCUMENTS

| | | | |
|---|---|---|---|
| 9,356,447 B2 * | 5/2016 | Mukherjee | ................ H02J 3/26 |
| 2014/0031997 A1 | 1/2014 | Mukherjee | .................... 700/291 |
| 2022/0069617 A1 | 3/2022 | Amthor | ............. H02J 13/00002 |

FOREIGN PATENT DOCUMENTS

DE    10 2018 222 753    6/2020    ............. G06Q 50/06

OTHER PUBLICATIONS

Search Report for International Application No. PCT/EP2022/066269, 10 pages, Oct. 7, 2022.

* cited by examiner

*Primary Examiner* — Hal Kaplan
(74) *Attorney, Agent, or Firm* — Slayden Grubert Beard PLLC

(57) ABSTRACT

Various embodiments of the present disclosure include a method for controlling one or more exchanges of energy between a plurality of installations using a control unit, wherein each installation is connected to one or more phases A,B,C of a three-phase power grid. An example method includes using the control unit to determine, within a time range T for each of the phases A,B,C and for each of the installations, associated time-dependent powers to be exchanged by means of an optimization method by extremalizing a target function. The target function includes a phase difference:

$$\sum_{t \in T} g(|P_t^A - P_t^B| + |P_t^B - P_t^C| + |P_t^C - P_t^A|)$$

(Continued)

as a term, where $P_t^{A,B,C}$ is in each case the sum of all powers to be exchanged via the respective phase A,B,C at the time t, and g≥0 is a weighting factor.

10 Claims, 1 Drawing Sheet

(58) Field of Classification Search
 USPC .......................................................... 307/43
 See application file for complete search history.

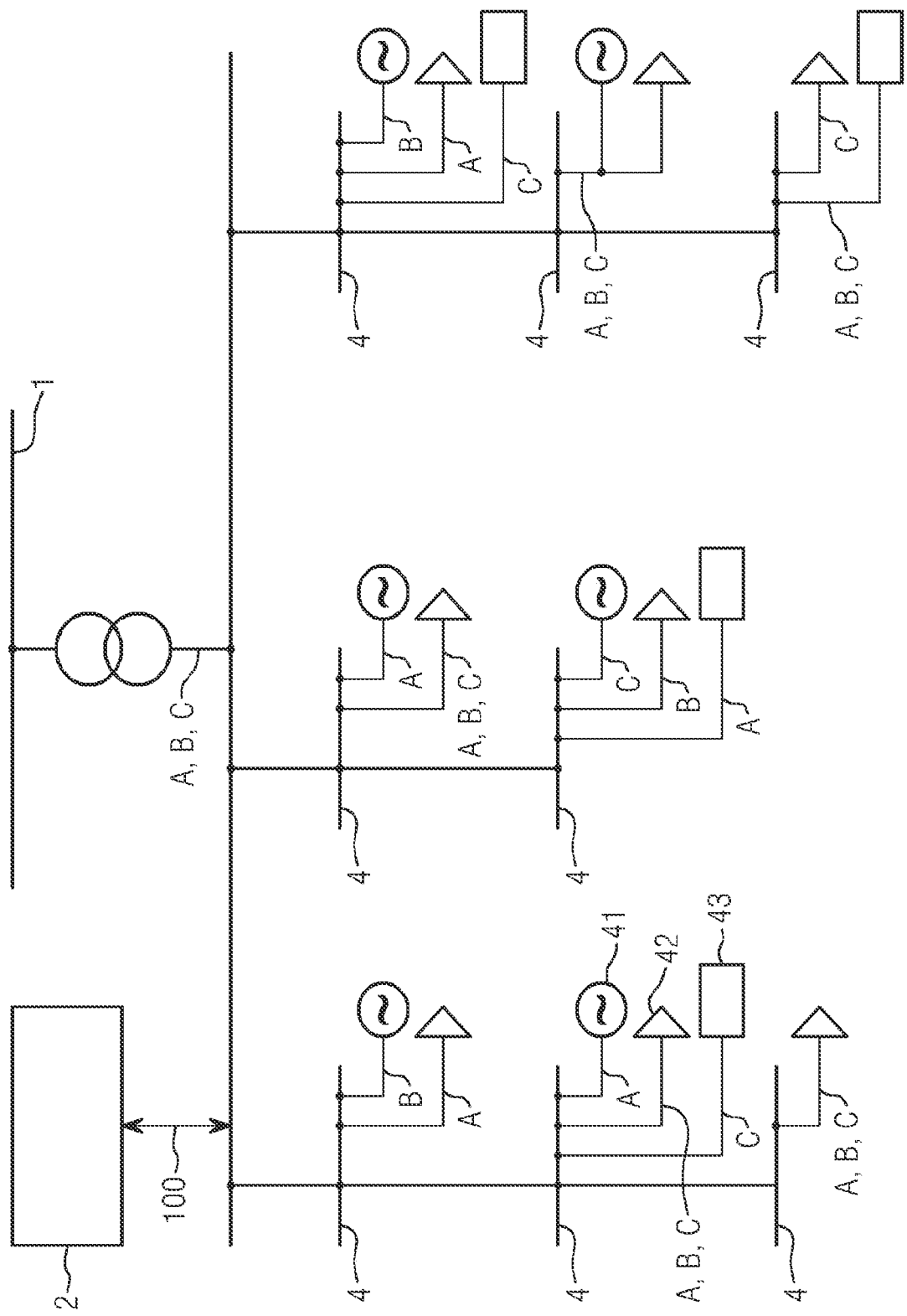

CONTROLLING EXCHANGES OF ENERGY BETWEEN A PLURALITY OF SYSTEMS CONNECTED TO AN ELECTRICAL GRID

CROSS-REFERENCE TO RELATED APPLICATIONS

This application is a U.S. National Stage Application of International Application No. PCT/EP2022/066269 filed Jun. 15, 2022, which designates the United States of America, and claims priority to EP Application No. 21184318.0 filed Jul. 7, 2021, the contents of which are hereby incorporated by reference in their entirety.

TECHNICAL FIELD

The present disclosure relates electrical power. Various embodiments of the teachings herein include systems and/or methods for controlling an exchange of energy between a plurality of systems connected to an electrical grid.

BACKGROUND

In recent years, the number of renewable installations that emit little to no carbon dioxide (Low Carbon Technologies; abbreviated to LCT) significantly increased. In this case, these LCT installations are typically connected to a three-phase medium-voltage grid or three-phase low-voltage grid. LCT installations may comprise photovoltaic installations, combined heat and power installations, as well as electric vehicles or heat pumps. Typically, the installations are connected to exactly one phase of the power grid.

Due to the dynamic load or generation of LCT installations, this can result in an uneven load on the phases of the power grid. However, for technically efficient and safe operation of a multi-phase power grid, it is necessary to keep imbalances between its phases as low as technically possible. An imbalance between the phases, i.e. phase asymmetry, can lead to ineffective use of the grid resources. In this case, the phase asymmetry results in individual phases being loaded significantly more than the other phases. In this case, heavily loaded phases and transformers are more susceptible to faults and must be serviced or replaced more regularly.

Furthermore, components of the power grid can be thermally overloaded by a pronounced phase asymmetry. The higher the current asymmetry, the higher the current intensity flowing through a neutral conductor. High currents additionally load the insulators thermally, which leads to insulation faults or a shortened service life of the installations.

In addition, there may be violation of voltage limits or voltage bands. A more heavily loaded phase experiences a greater voltage drop, while the phase-neutral voltage of the more weakly loaded phase increases. If the voltage level moves outside the acceptable voltage range, for example plus/minus five percent, this causes a safety issue and an operational risk to connected consumers. Moreover, emerging decentralized approaches, such as local energy markets, could not be used if technical limit values are violated due to unequal loads of phases.

The prior art discloses only static methods for avoiding phase asymmetries, which methods cannot react sufficiently quickly to the dynamic changes of renewable or volatile installations (LCT installations).

SUMMARY

The teachings of the present disclosure may be used to provide systems and/or methods for reducing phase asymmetries within a multi-phase power grid. For example, some embodiments include a method for controlling one or more exchanges of energy between a plurality of installations (41, 42, 43) by means of a control unit (2), wherein each installation (41, 42, 43) is connected to one or more phases A,B,C of a three-phase power grid (1), wherein the control unit (2) for controlling the exchanges of energy determines, within a time range T for each of the phases A,B,C and for each of the installations (41, 42, 43), associated time-dependent powers to be exchanged by means of an optimization method by extremalizing a target function, characterized in that the target function includes a phase difference $$\sum_{t \in T} g(|P_t^A - P_t^B| + |P_t^B - P_t^C| + |P_t^C - P_t^A|)$$

as a term, where $P_t^{A,B,C}$ is in each case the sum of all powers to be exchanged via the respective phase A,B,C at the time t, and $g \geq 0$ is a weighting factor.

In some embodiments, the determined powers are exchanged at the respective time t via the respective phase A,B,C of the power grid (1).

In some embodiments, the phases A,B,C provided by the optimization method and for the exchange of energy are set on the respective installations.

In some embodiments, the target function comprises an exchange term to be maximized, wherein the exchange term maximizes the amount of energy exchanged between the installations (41, 42, 43).

In some embodiments, the phases A,B,C, to which the respective installation (41, 42, 43) is connected, are transmitted to the control unit (2).

In some embodiments, one or more maximum powers and a maximum amount of energy to be exchanged within the time range T are transmitted to the control unit (2) in advance of the optimization method for each of the installations (41, 42, 43) and are taken into account in the optimization method as secondary conditions.

In some embodiments, the installations (41, 42, 43) are in the form of photovoltaic installations, energy stores, charging stations, electric vehicles and/or heat pumps.

As another example, some embodiments include a control unit (2) for controlling one or more exchanges of energy between a plurality of installations (41, 42, 43), wherein each installation (41, 42, 43) is connected to one or more phases A,B,C of a three-phase power grid (1), wherein the control unit (2) for controlling the exchanges of energy is designed to determine, within a time range T for each of the phases A,B,C and for each of the installations (41, 42, 43), associated time-dependent powers to be exchanged by means of an optimization method by extremalizing a target function, characterized in that the target function includes a phase difference $$\sum_{t \in T} g(|P_t^A - P_t^B| + |P_t^B - P_t^C| + |P_t^C - P_t^A|)$$

as a term, where $P_t^{A,B,C}$ is in each case the sum of all powers to be exchanged via the respective phase A,B,C at the time t, and $g \geq 0$ is a weighting factor.

In some embodiments, the control unit (2) comprises a communication module for exchanging data with the installations (41, 42, 43).

In some embodiments, the control unit (2) is designed to set the respective powers of the respective phase A,B,C of the installations (41, 42, 43) according to the powers determined by the optimization method.

BRIEF DESCRIPTION OF THE DRAWING

Further advantages, features, and details of the teachings herein are apparent from the exemplary embodiments described below and with reference to the drawing. In this case, the single figure schematically shows a plurality of energy systems having a plurality of installations, the energy exchanges of which are controlled according to an example embodiment of the teachings of the present disclosure. Identical, equivalent or functionally identical elements may be provided with the same reference signs in the figure which shows a control unit incorporating teachings of the present disclosure.

DETAILED DESCRIPTION

Various embodiments of the teachings herein include methods for controlling one or more exchanges of energy between a plurality of installations by means of a control unit, wherein each installation is connected to one or more phases A,B,C of a three-phase power grid, wherein the control unit for controlling the exchanges of energy determines, within a time range T for each of the phases A,B,C and for each of the installations, associated time-dependent powers to be exchanged by means of an optimization method by extremalizing a target function, is characterized in that the target function includes a phase difference $$\sum_{t \in T} g(|P_t^A - P_t^B| + |P_t^B - P_t^C| + |P_t^C - P_t^A|)$$

as a term, where $P_t^{A,B,C}$ is in each case the sum of all powers to be exchanged via the respective phase A,B,C at the time t, and $g \geq 0$ is a weighting factor.

The methods and/or one or more functions, features, and/or elements of the methods may be computer-aided. In particular, the optimization method may be carried out by means of a computing unit of the control unit.

In some embodiments, the power grid is in the form of a medium-voltage grid and/or low-voltage grid.

The methods described herein may be used for controlling a power grid, thus reducing or avoiding a phase asymmetry between the phases of the power grid. For this purpose, the teachings provide for the exchanges of energy or exchanges of power between a plurality of installations connected to the power grid to be controlled. In other words, the teachings also include methods for reducing phase asymmetries between the phases of a multi-phase power grid.

In the present disclosure, an exchange of energy and an exchange of power are considered to be equivalent. If a possibly time-dependent electrical power is provided, generated, and/or consumed by one of the installations over a certain time range, a certain amount of electrical energy, which is exchanged within the time range mentioned (exchange of energy), is transmitted via the power grid, corresponds to this. In this case, the power can vary over time or be constant within the time range. An exchange of energy is thus a feed of electrical energy into the power grid and/or out of the power grid by the installations.

The installations are connected to one or more phases of the power grid. Typically, an installation is connected to either exactly one of the phases or to all phases of the power grid. For example, installations with a multi-phase connection are photovoltaic installations with a peak power of more than 10 kilowatts or charging stations for electric vehicles with a charging power of more than 10 kilowatts.

Typically, a plurality of installations are assigned to one energy system. Such an energy system, such as an office building or a residential building, can thus comprise one or more of the installations. Here, the energy systems are the connectees with regard to the power grid. In other words, a plurality of energy systems are connected to the power grid and also exchange electrical energy/power via the power grid. In this case, the energy systems comprise one or more energy-related installations which are controlled. The exchanges of energy between the energy systems are thus also controlled. The energy systems are typically connected to all three phases of the power grid. The installations of the respective energy system may be connected to one or more of the phases of the power grid via the connection point of their energy system.

The time-dependent powers that are intended to be exchanged between the installations, at least within the time range T, for example over one day, are calculated by means of the optimization method. In this case, the time range T is typically a future time range. In other words, it is determined which time-dependent (electrical) power an installation will provide, generate and/or consume within the future time range T. In this case, the respective powers can be time-dependent within the time range T. If the time range T is divided into discrete time steps or times, the powers for each of these time steps are determined. In other words, in this case $T=[t_1, \ldots, t_n]$ and for example for one of the installations $P=[P_1, \ldots, P_n]$ and $E=\Sigma_{i=1,\ldots,n} P_i \cdot \Delta t$, where $\Delta t$ denotes the time step size of the discretization of the time range T. A distinction must also be made here as to which phase is used to exchange the power or energy.

The optimization method determines the time-dependent powers or their values for each of the installations. For this purpose, a target function is extremalized, e.g. a minimum or maximum of the target function is determined numerically. In this case, the target function depends on the powers of the installations, with the result that it is determined for which powers or for which values of the powers the target function is at a minimum or maximum. In this case, the target function is typically formed by the total amount of energy to be exchanged. In this case, the target function is maximized such that the total amount of energy (locally) exchanged between the energy systems or installations is maximized. The powers or power values determined in this way are then used as a basis for the control, with the result that the installations are ultimately operated within the time range T with the determined or calculated powers. In other words, the determined powers form target values for controlling or regulating the installations and thus for controlling the exchanges of energy for the time range T. Thus, the control of the exchanges of energy is based on the determined powers. According to the determined powers, it is therefore determined which installation feeds in or feeds out which power at what time. The installations are then operated according to the determined powers. The determination of the powers to be exchanged can be repeated regularly in this case for a plurality of time ranges.

In some embodiments, the target function comprises the further term $E_{t \in T} g(|P_t^A - P_t^B| + |P_t^B - P_t^C| + |P_t^C - P_t^A|)$. This quantifies a phase difference or a phase asymmetry between the phases of the power grid. Here, the phase asymmetry is formed by the (total) power difference in terms of absolute value between the phase A and the phase B, by the (total) power difference in terms of absolute value between the phase B and the phase C, and by the (total) power difference in terms of absolute value between the phase C and the phase A. The total asymmetry between the phases (phase difference or phase difference term) is then formed by the weighted sum of the mentioned (total) performance differences over all times t of the time range T or time period. In other words, $g(|P_t^A-P_t^B|+|P_t^B-P_t^C|+|P_t^C-P_t^A|)$ is minimized for each time step or time t of the time range T. In this case, $P_t^{A,B,C}$ is the total power that is present at the phase A, B or C at the time t.

The phase difference term is included in the target function in this case in such a way that this is minimized when extremalizing the target function, especially when maximizing it. This can be ensured by a corresponding sign of the phase difference term.

The weighting factor g gives a stronger weight to the phase difference between two phases, with the result that it can be determined thereby whether one of the phases is preferred and how much it is preferred. The weighting factor can be determined or set in advance. In some embodiments, the target function comprises a plurality of terms, with the result that the weighting factor can be used to weight the importance of phase symmetry over these other terms.

For example, the target function includes the total amount of energy to be exchanged, which is to be maximized. The weighting factor can be used to weight the total amount of energy exchanged against the phase symmetry. In other words, in this case, the exchange of a maximum amount of energy, possibly at the expense of a larger phase asymmetry, can be preferred. Typically, phase balancing is performed for a numerically small weighting factor only when there are a plurality of solutions to the optimization problem. For a numerically large weighting factor, the phase difference term has a significant influence, and so certain phases are preferred over the other phases for the exchange of energy.

The teachings herein make it possible to operate local energy systems more safely and reliably, taking into account the phase connection of each installation. By minimizing the phase deviation by means of the phase difference term, the control ensures phase balancing which is of the greatest technical importance for the operation of the power grid. The present invention also makes it possible to reduce and at best avoid the installation of cost-intensive equipment, such as phase switches and/or phase balancers. Furthermore, complex grid expansions can be reduced or avoided, since phase balancing and efficient grid operation can already be achieved by the present control according to the invention without additional investments.

Furthermore, the methods require little implementation effort or expense, since they can be implemented in addition to already existing local controllers or control units, for example for local energy markets. Known control operations are often already based on an optimization problem. In particular, the teachings of the present disclosure may be particularly advantageous for operating local energy markets. This is the case because a control apparatus of the local energy market typically performs an optimization method to determine the energies/powers to be exchanged. In this case, it is possible to take into account the phase difference term within the meaning of the present disclosure.

Based on the information relating to the offers of the participants (energy systems), the powers to be exchanged are therefore determined taking into account a technically advantageous symmetry of the phases. In other words, a local energy market platform comprises a control unit incorporating teachings of the present disclosure. Thus, the energy market platform is designed to carry out one or more of the methods described herein. The energy market platform thus maintains cost-efficient operation of local energy systems, while the power supply quality, the technical requirements and the technical safety aspects are taken into account using the phase difference term.

In some embodiments, a control unit for controlling one or more exchanges of electrical energy between a plurality of systems, wherein each system is connected to one or more phases A,B,C of a three-phase power grid, wherein the control unit for controlling the exchanges of energy is also designed to determine, within a time range T for each of the phases A,B,C and for each of the installations, associated time-dependent powers to be exchanged by means of an optimization method by extremalizing a target function, is characterized in that the target function includes a phase difference $$\sum_{t \in T} g(|P_t^A - P_t^B| + |P_t^B - P_t^C| + |P_t^C - P_t^A|)$$

as a term, where $P_t^{A,B,C}$ is in each case the sum of all powers to be exchanged via the respective phase A,B,C at the time t, and g≥0 is a weighting factor.

Similar and equivalent advantages and/or embodiments to those of the methods described herein arise.

In some embodiments, the determined powers are exchanged at the respective time t via the respective phase A,B,C of the power grid. In other words, the exchanges of energy are carried out according to the determined powers. In this case, the control unit can transmit the determined powers to the installations and/or their energy systems, for example as target values. Local control units of the energy systems and/or of the installations then control the installations according to the determined powers. In other words, the control unit is designed to set the respective powers of the respective phase A,B,C of the installations according to the powers determined by the optimization method.

In some embodiments, the phases A,B,C provided by the optimization method and for the exchange of energy are set on the respective installations. After optimization, it is determined which installation feeds which power into or out of the power grid at what time via which phase. In other words, the optimization result determines the time-dependent powers and the associated phase. In this case, it may be necessary for the phase of an installation to be switched over or adjusted. This can be done, for example, by means of a phase switch. If an installation can only be operated on one phase, it could happen that the phase asymmetry does not allow it to provide or consume power at one or more times. This is advantageously prevented by switching over and thus adjusting the phases. This symbolically results in more room for maneuver, which can advantageously be used for phase balancing. Provision is likewise made for the phases of a plurality of installations in an energy system to be switched over.

In some embodiments, the target function comprises an exchange term to be maximized, wherein the exchange term maximizes the amount of energy exchanged between the installations. In other words, the target function preferably has two terms, the phase difference term and the exchange term. The exchange term models the total amount of energy that is exchanged within the time range T. In this case, the exchange term depends on the powers of the installations, the powers of the installations form the variables of the target function and the optimization problem. In this case, the exchange term may be formed by a linear combination of the powers of the installations. Typically, the exchange term is maximized and the phase difference term is minimized, with the result that they have a different sign within the target function. For a local energy market, the exchange term is also referred to as social welfare.

In some embodiments, the phases A,B,C, to which the respective installations are connected, are transmitted to the control unit. As a result, the control unit, which performs the optimization and thus determines the powers to be exchanged, knows which installation is connected to which phase. The phase connections of the installations can be taken into account in the optimization.

In some embodiments, one or more maximum powers and a maximum amount of energy to be exchanged within the time range T are transmitted to the control unit in advance of the optimization method for each of the installations and are taken into account in the optimization method as secondary conditions. For this purpose, the control unit may comprise a communication module for exchanging data with the installations and/or the energy systems.

Typically, optimization methods have a plurality of secondary conditions. In some embodiments, at least the maximum power of the installation and the maximum amount of energy to be exchanged within the time range T are taken into account in the present case in the optimization as a secondary condition. This ensures that technical boundary conditions of the installations are met by the result of the optimization. In addition, in the case of a local energy market, for example, it is informed in advance, in particular through offers, what amount of energy is intended to be exchanged. This allows the method to be integrated even more efficiently and easily into an existing local energy market.

In some embodiments, the installations are in the form of photovoltaic installations, energy stores, charging stations, electric vehicles and/or heat pumps. The methods may be advantageous for said installations or for energy systems comprising one or more of said installations. Said installations typically exhibit greater volatility in terms of their generation or consumption, and so phase balancing is technically required for these LCT installations. This phase balancing is made possible by the present method and/or one of its embodiments. Thus, the method may be particularly advantageous for local energy markets which have a larger number of LCT installations.

The figure shows a control unit 2 incorporating teachings of the present disclosure and designed to control one or more exchanges of energy between a plurality of energy systems 4. In this case, the energy is exchanged via a three-phase power grid 1. The power grid 1 thus has three phases A,B,C.

The energy systems 4 have one or more energy installations 41, 42, 42. For reasons of clarity, the installations are provided with the reference signs 41, 42, 43 only for one of the energy systems 4 shown.

The energy systems 4, for example residential buildings, are connected to the power grid 1. Furthermore, the installations 41, 42, 43 are connected to the power grid 1, for example via the grid connection point of their energy system 4. The installations 41, 42, 43 can therefore feed a specific power into the power grid 1 (generator) and/or out of it (consumer) at one time.

The installations 41, 42, 43 are connected to one or more phases A,B,C of the power grid 1. In other words, energy can basically be exchanged via one or more phases A,B,C of the power grid 1. The respective phase connection of an installation 41, 42, 43 is indicated in the figure with the letters A,B,C.

The control unit 2 controls the exchanges of energy between the energy systems 4 and thus between the installations 41, 42, 43 of the energy systems 4. For this purpose, the control unit 2 has a communication module not shown. By means of the communication module, the control unit 1 can exchange data or information with the energy systems 4 and/or the installations 41, 42, 43. The data exchange is symbolized in a simplified manner in the figure with the double arrow 100. In particular, calculated target values for the respective powers can be transmitted to the individual installations thereby. The local installations 41, 42, 43 are then operated according to the transmitted target values.

The control unit 2 determines the target values for the powers to be exchanged within a time range T by means of an optimization method, in which a target function is extremalized. This can be done by means of a computing unit of the control unit 2. The powers to be exchanged (target values) are determined by the extremalization. In this case, the target function comprises according to the invention the phase difference term $E_{t \in T} g(|P_t^A - P_t^B| + |P_t^B - P_t^C| + |P_t^C - P_t^A|)$, wherein $P_t^{A,B,C}$ is in each case the sum of all powers to be exchanged via the respective phase A,B,C at the time t, and $g \geq 0$ is a weighting factor. The phase difference term in the target function ensures sufficient phase symmetry in the exchanges of energy. In other words, the powers to be exchanged are determined in such a way that the phase asymmetry between the phases A,B,C of the power grid 1 is minimized for the actual exchanges of energy. It is a finding of the present invention that this technical objective is made possible by taking into account the above-mentioned phase difference term. This is to be clarified by means of the following exemplary embodiment.

If no optimization is carried out, there is an excess of energy in the phase A at a first time within the time range T and there is an increased consumption, that is an increased load, in the same phase A at a later, second time. If the optimization is now carried out, a plurality of flexible loads, such as battery stores and/or electric vehicles, could be connected to the phase A at the first time, with the result that the excess energy is used for these. At the second time, additional feeders, for example battery stores, could feed into the phase A by switching over the phases A,B,C, and/or the load of flexible consumers can be shifted to a later time. In addition, phase switches or installations with a flexible phase connection (connected to more than one phase) could provide flexibility by switching the phases A,B,C according to the result of the optimization. This is made possible by the target functions or the phase balancing term described herein. Thus, the locally exchanged amount of energy can be maximized, while the deviation between the phases A,B,C is kept as minimal as possible.

Furthermore, this may be particularly advantageous for local energy markets. In this case, the control unit 2 forms a local energy market platform. However, known local energy markets are typically market-driven, meaning that market variables such as prices are substantially essential for determining the exchanges of energy. In the present case, additional technical control deviating from this would be carried out, according to which the exchanges of energy determined on a market-dependent basis are carried out with the greatest possible phase symmetry. In other words, a local energy market designed according to the invention takes into account the technical requirement of the greatest possible phase symmetry between the phases A,B,C of the power grid 1.

For example, two electric vehicles of two energy systems 4 transmit an offer for a purchase of a certain amount of energy within a time range T for charging to the control unit 2. Furthermore, a respective maximum charging power is transmitted to the control unit 2. Furthermore, one of the electric vehicles is connected to the phase A and the other of the electric vehicles is connected to the phase B. In principle, the amount of energy that is intended for charging in each case must only be provided over the time range T. In other words, only $\text{E}_{t=0}{}^{T}\text{P}_{t}=\text{E}$ for the time-dependent $P_t$ powers needs to be fulfilled, where E is the amount of energy transmitted. It is initially irrelevant what power exactly is used for charging at what time as long as the maximum charging power is not exceeded over the entire time range T. This can be ensured by appropriate secondary conditions during optimization.

This provides basic flexibility for such installations, such as electric vehicles or charging stations, which can be used for phase balancing. If, for example, the phase C were overloaded in comparison with the phase B and phase A at one time, the optimization would prefer an increase in the load in phase A, for example charging the electric vehicle on phase A, over supplying the loads by means of the phase C. This technically advantageous phase balancing between the phases A,B,C is made possible by the phase difference term or phase balancing term within the target function and thus by the control according to the invention.

Furthermore, the weighting factor g provided within the phase difference term may be advantageous for a local energy market. For small weighting factors, phase balancing is typically performed only when there are basically a plurality of results for maximizing the total amount of energy exchanged. This is because, when maximizing the total amount of energy exchanged, it does not matter which phase is used for this. For a small weighting factor, the additional phase difference term therefore only leads to a small balance between the phases. If, for example, it would be positive for the phase balance to carry out charging using the phase A, the target function with the phase difference term typically leads directly to the result of carrying out charging via the phase A, even for small weighting factors. Higher weighting factors, on the other hand, can directly affect the phase intended for charging. In the context of a local energy market, this applies even when charging with the further phases involves higher costs. For example, 32 cents/kWh are provided for charging via the phase A. For example, 30 cents/kWh are provided for charging via the phase B. Known local energy market platforms would thus carry out charging via the phase A.

In the present case, a weighting factor $g/\Delta t$ with a value of greater than or equal to 2 cents/kWh may prefer phase balancing. Here, $\Delta t$ is the time step size of the discretization of the time range T, for example 15 minutes (96 time steps) for one day. In other words, the weighting factor makes it possible, so to speak, to disregard the pure market result and to place a higher weighting on the technical requirements of phase symmetry compared to pure market-oriented considerations. This provides a local energy market that technically implements the technical requirement of high phase symmetry in trade.

Although the teachings herein have been described and illustrated in more detail by way of the exemplary embodiments, the scope of the disclosure is not restricted by the disclosed examples, or other variations may be derived therefrom by a person skilled in the art without departing from the scope of protection.

LIST OF REFERENCE SIGNS

1 Power grid
2 Control unit
4 Energy systems
41 Installation
42 Installation
43 Installation
100 Data exchange

What is claimed is:

1. A method for controlling one or more exchanges of energy between a plurality of installations using a control unit, wherein each installation is connected to one or more phases A, B, C of a three-phase power grid, the method comprising:
using the control unit to determine, within a time range T for each of the phases A, B, C and for each of the installations, associated time-dependent powers to be exchanged by means of an optimization method by extremalizing a target function;
wherein the target function includes a phase difference:

$$\sum_{t \in T} g\left(\left|P_t^A - P_t^B\right| + \left|P_t^B - P_t^C\right| + \left|P_t^C - P_t^A\right|\right)$$

as a term, where $P_t^{A, B, C}$ is in each case the sum of all powers to be exchanged via the respective phase A, B, C at the time t, and $g>0$ is a weighting factor.

2. The method as claimed in claim 1, wherein the determined powers are exchanged at the respective time t via the respective phase A, B, C.

3. The method as claimed in claim 1 wherein the phases A, B, C are set on the respective installations.

4. The method as claimed in claim 1, wherein:
the target function comprises an exchange term to be maximized; and
the exchange term maximizes the amount of energy exchanged between the installations.

5. The method as claimed in claim 1, comprising transmitting the phases A, B, C, to which the respective installation is connected to the control unit.

6. The method as claimed in claim 1, further comprising:
transmitting one or more maximum powers and a maximum amount of energy to be exchanged within the time range T to the control unit in advance of the optimization method for each of the installations and
taking the one or more maximum powers and the maximum amount of energy into account in the optimization method as secondary conditions.

7. The method as claimed in claim 1, wherein the installations comprise photovoltaic installations, energy stores, charging stations, electric vehicles, and/or heat pumps.

8. A control unit for one or more exchanges of energy between a plurality of installations connected to one or more phases A, B, C of a three-phase power grid, the control unit programmed to:
determine, within a time range T for each of the phases A, B, C and for each of the installations, associated time-dependent powers to be exchanged by means of an optimization method by extremalizing a target function;
wherein the target function includes a phase difference $$\sum_{t \in T} g\left(\left|P_t^A - P_t^B\right| + \left|P_t^B - P_t^C\right| + \left|P_t^C - P_t^A\right|\right)$$

as a term, where $P_t^{A, B, C}$ is in each case the sum of all powers to be exchanged via the respective phase A, B, C at the time t, and $g>0$ is a weighting factor.

9. The control unit as claimed in claim 8, further comprising a communication module for exchanging data with the installations.

10. The control unit as claimed in claim 8, further programmed to set the respective powers of the respective phase A, B, C of the installations according to the powers determined by the optimization method.

\* \* \* \* \*